United States Patent
Ying et al.

(10) Patent No.: US 8,036,000 B2
(45) Date of Patent: Oct. 11, 2011

(54) RESONANT CONVERTER SYSTEM AND CONTROLLING METHOD THEREOF HAVING RELATIVELY BETTER EFFICIENCY

(75) Inventors: Jianping Ying, Shanghai (CN); Yiqing Ye, Shanghai (CN); Chao Yan, Shanghai (CN); Jianhong Zeng, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 721 days.

(21) Appl. No.: 11/867,349

(22) Filed: Oct. 4, 2007

(65) Prior Publication Data
US 2008/0247194 A1 Oct. 9, 2008

(30) Foreign Application Priority Data
Apr. 3, 2007 (TW) ................................ 96111891 A (51) Int. Cl.
*H02M 3/335* (2006.01)
(52) U.S. Cl. ........................ 363/21.02; 323/98; 323/132
(58) Field of Classification Search .................... 363/17, 363/21.02, 21.03, 55–56.05, 98, 132
See application file for complete search history.

(56) References Cited

U.S. PATENT DOCUMENTS

| | | | | |
|---|---|---|---|---|
| 5,875,103 A * | 2/1999 | Bhagwat et al. | ................ | 363/17 |
| 5,946,200 A * | 8/1999 | Kim et al. | ........................ | 363/17 |
| 6,011,708 A * | 1/2000 | Doht et al. | ..................... | 363/98 |
| 6,252,782 B1 * | 6/2001 | Akashi et al. | .................. | 363/17 |
| 6,344,979 B1 * | 2/2002 | Huang et al. | ................... | 363/16 |
| 6,400,590 B2 * | 6/2002 | Hickman | ....................... | 363/65 |
| 6,646,898 B2 * | 11/2003 | Furukawa et al. | ............ | 363/132 |
| 7,286,376 B2 * | 10/2007 | Yang | .............................. | 363/97 |

* cited by examiner

*Primary Examiner* — Jessica Han
(74) *Attorney, Agent, or Firm* — Volpe And Koenig, P.C.

(57) ABSTRACT

The configurations of a resonant converter system and a controlling method thereof are provided. The proposed resonant converter system includes a resonant converter and a hybrid control apparatus coupled to the resonant converter for generating a driving signal to adjust a phase angle and a frequency of the resonant converter such that the resonant converter would reach a relatively lower voltage gain and have a relatively lower loss during an abnormal operation.

19 Claims, 9 Drawing Sheets

Fig. 8

RESONANT CONVERTER SYSTEM AND CONTROLLING METHOD THEREOF HAVING RELATIVELY BETTER EFFICIENCY

FIELD OF THE INVENTION

The present invention relates to a resonant converter system. More particularly, the present invention relates to a resonant converter system having a hybrid control apparatus.

BACKGROUND OF THE INVENTION

The developing trend of the DC/DC converters is in the same direction like most of the power supply products that is to have the high efficiency, the high power density, the high reliability and the low cost. Since the resonant converters usually employ the controlling method of pulse frequency modulation (PFM), the zero-voltage switching of their switches is relatively easy to accomplish so as to achieve the requirements of high efficiency and high power density.

Figure 1:
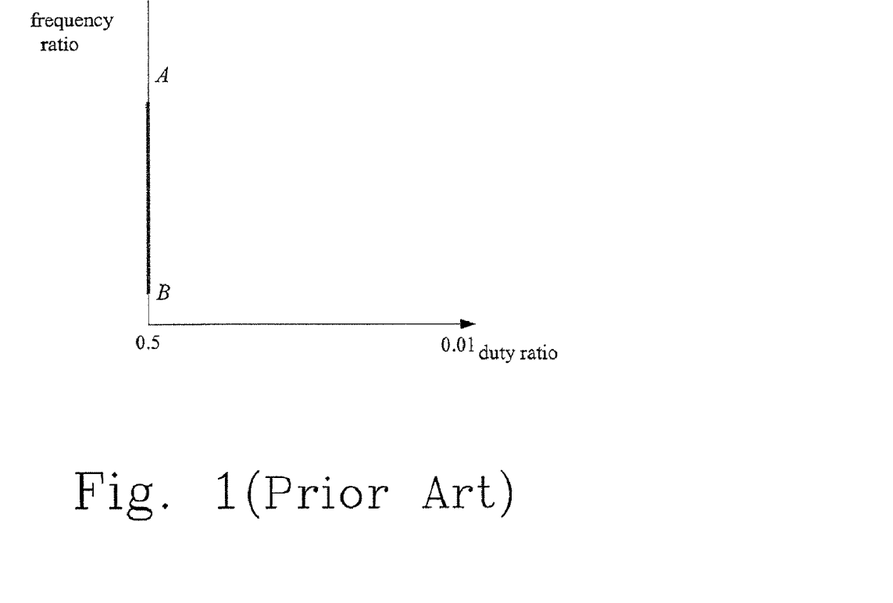
FIG. 1 shows a waveform diagram of a converter's frequency ratio vs. the converter's duty ratio regarding a controlling method of simply adjusting the frequency for a resonant converter in the prior art.

However, the resonant converters still have some problems when simply adopting PFM during the abnormal status such as a circuit starting status or an output current-limiting status etc. A relatively lower voltage gain of the circuit is required when a resonant converter is working under an abnormal status; especially when a circuit is under the output current-limiting status, the circuit current has to be controlled so as to cause the circuit to operate normally. To achieve these requirements, the working frequency of the resonant converter has to be increased, and the increased working frequency means that the loss of the circuit is also increased. The total loss of the converter is larger than the converter could bear when the frequency increased to a specific value, and the converter is thus damaged. Please refer to FIG. 1, which shows a waveform diagram of a converter's frequency ratio vs. the converter's duty ratio regarding a controlling method of simply adjusting the frequency for a resonant converter in the prior art. In FIG. 1, the horizontal axis is the duty ratio of the converter and the vertical axis is the frequency ratio of the working frequency of the converter to the resonant frequency of the converter.

Figure 2:
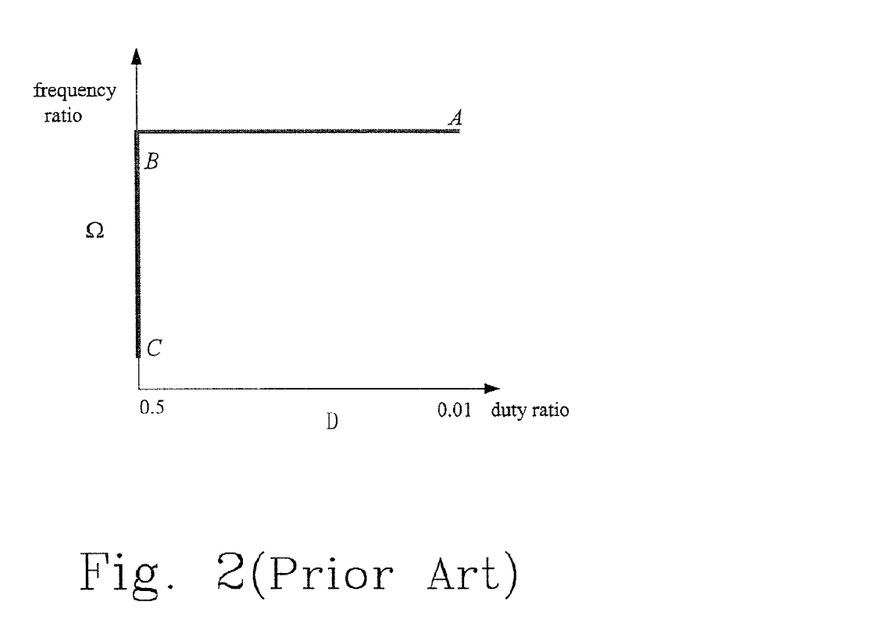
FIG. 2 shows a waveform diagram of a converter's frequency ratio vs. the converter's duty ratio regarding a controlling method of adjusting the frequency and the duty ratio separately for a resonant converter in the prior art.

The aforementioned control method of simply changing the frequency can not solve the problem that the loss of the circuit is too big to bear when it is working under an abnormal status. Another controlling method uses the frequency modulation plus the pulse-width modulation as shown in FIG. 2. Referring to FIG. 2, it shows a waveform diagram of a converter's frequency ratio vs. the converter's duty ratio regarding a controlling method of adjusting the frequency firstly and the duty ratio secondly, for a resonant converter in the prior art. Also, the horizontal axis is the duty ratio of the converter and the vertical axis is the frequency ratio of the working frequency and the resonant frequency of the converter. The working trace of the converter goes by controlling the duty ratio from A to B firstly, and then modifying the operating frequency of the converter within BC stage secondly, and vice versa. Due to that the controlling method of pulse-width modulation is employed, the switch frequency is relatively lower than that only adopting of the controlling method of changing the frequency under the same voltage gain. But through minishing the pulse-width, it may cause the hard-switching of the circuit which increases the total loss of the converter.

Figure 3:
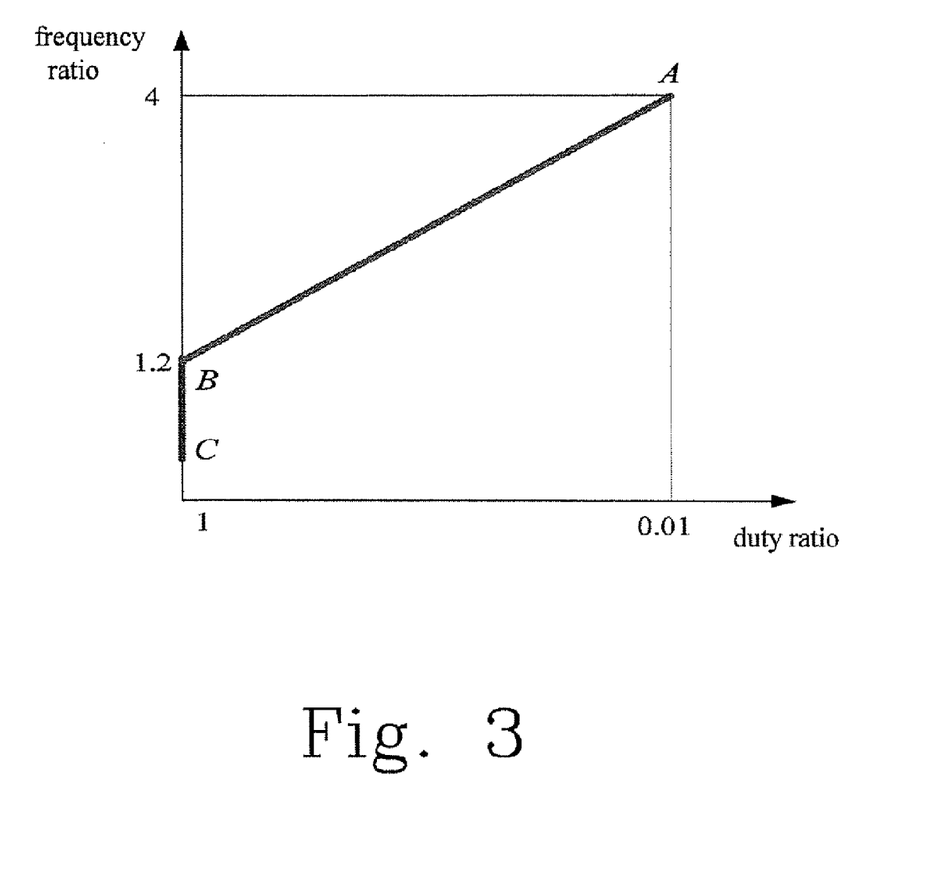
FIG. 3 shows a waveform diagram of a converter's frequency ratio vs. the converter's duty ratio regarding a controlling method of adjusting the frequency and the phase angle for a resonant converter according to the preferred embodiments of the present invention.

Keeping the drawbacks of the prior arts in mind, and employing experiments and research full-heartily and persistently, the applicant finally conceived a resonant converter system and a controlling method thereof having a relatively better efficiency. In FIG. 3, it shows a waveform diagram of a converter's frequency ratio vs. the converter's duty ratio regarding a controlling method of adjusting the frequency and the phase angle for a resonant converter according to the preferred embodiments of the present invention.

SUMMARY OF THE INVENTION

It is therefore an object of the present invention to provide a resonant converter system having a relatively better efficiency to adjust a phase angle and a frequency of the resonant converter system such that the resonant converter system would reach a relatively lower voltage gain and have a relatively lower loss when the resonant converter system is working under an abnormal status.

According to the first aspect of the present invention, the resonant converter system includes a resonant converter receiving an input voltage for outputting an output voltage and having a switching device, and a hybrid control apparatus coupled to the resonant converter for generating a driving signal to selectively adjust one of: a frequency of the switching device when a voltage gain of the resonant converter system is relatively high, and a combination of a phase angle and the frequency of the switching device when a voltage gain of the resonant converter system is relatively low such that the resonant converter would reach a relatively lower voltage gain and have a relatively lower loss when the resonant converter is working under an abnormal status.

Preferably, the resonant converter is one of a DC/DC resonant converter and a DC/AC resonant converter.

Preferably, the abnormal status is one of a starting status and a current limiting status of the resonant converter.

Preferably, the resonant converter includes a full-bridge switching device, and the full-bridge switching device includes a first and a second input terminals receiving the input voltage, a first and a second output terminals outputting a first AC output voltage, a first power switch module including a first power switch having a first terminal coupled to the first input terminal, a second terminal coupled to the first output terminal and a control terminal, and a first diode having an anode coupled to the second terminal of the first power switch and a cathode coupled to the first terminal of the first power switch, a second power switch module including a second power switch having a first terminal coupled to the first terminal of the first power switch, a second terminal coupled to the second output terminal and a control terminal and a second diode having an anode coupled to the second terminal of the second power switch and a cathode coupled to the first terminal of the second power switch, a third power switch module including a third power switch having a first terminal coupled to the second terminal of the first power switch, a second terminal coupled to the second input terminal and a control terminal and a third diode having an anode coupled to the second terminal of the third power switch and a cathode coupled to the first terminal of the third power switch, and a fourth power switch module including a fourth power switch having a first terminal coupled to the second output terminal, a second terminal coupled to the second terminal of the third power switch and a control terminal, and a fourth diode having an anode coupled to the second terminal of the fourth power switch and a cathode coupled to the first terminal of the fourth power switch, in which the driving signal includes a first to a fourth gate driving signals, and the control terminals of the first to the fourth power switches are coupled to the hybrid control apparatus and receive the first to the fourth gate driving signals respectively.

Preferably, the resonant converter is a full-bridge LLC resonant DC/DC converter and further includes an LLC resonant tank coupled to the first and the second output terminals of the full-bridge switching device for generating a resonance, a transformer receiving the first AC output voltage for outputting a second AC output voltage, and including a primary winding having a first terminal coupled to the LLC resonant tank and a second terminal coupled to the full-bridge switching device, and a secondary winding having a first terminal and a second terminal, a rectifier coupled to the first and the second terminals of the secondary winding for receiving the second AC output voltage, and an output capacitor coupled to the rectifier for outputting a DC output voltage.

Preferably, the LLC resonant tank includes a resonant capacitor having a first terminal coupled to the first output terminal of the full-bridge switching device and a second terminal, a resonant inductor having a first terminal coupled to the second terminal of the resonant capacitor and a second terminal, and an exciting inductor having a first terminal coupled to the second terminal of the resonant inductor and a second terminal coupled to the second output terminal of the full-bridge switching device, in which the exciting inductor is electrically connected to the primary winding in parallel.

Preferably, the rectifier is a full-wave rectifier.

Preferably, the hybrid control apparatus includes a current sensor coupled to the resonant converter for generating a sensed current, a voltage sensor coupled to the resonant converter for generating a sensed voltage, an error signal generating apparatus receiving the sensed current and the sensed voltage for generating an error signal, and a phase angle and frequency modulator receiving the error signal for generating the first to the fourth gate driving signals.

Preferably, the error signal generating apparatus includes an optical coupling device transmitting a synchronous signal, a reference voltage regulator receiving the transmitted synchronous signal for generating a reference voltage, a current regulator receiving the sensed current and a reference current for generating a current regulating signal and a voltage regulator receiving the sensed voltage and the reference voltage for generating a voltage regulating signal, in which the error signal is generated via an AND operation of the current regulating signal and the voltage regulating signal.

Preferably, the phase angle and frequency modulator includes an optical coupling device receiving and transmitting the error signal, a frequency modulator receiving the transmitted error signal for generating a frequency modulation signal, a pulse-width modulator receiving the transmitted error signal for generating a pulse-width modulation signal, a voltage controlled oscillator receiving the frequency modulation signal for generating an oscillating signal, a phase-shift generator receiving the pulse-width modulation signal and the oscillating signal for generating a first to a fourth outputting signals, in which the oscillating signal includes a triangle signal and a pulse signal, and a first to a fourth drivers respectively receiving the first to the fourth outputting signals for generating the first to the fourth gate driving signals.

Preferably, the optical coupling device includes a first, a second and a third input terminals, an output terminal, a ground, an opto-coupler having a first input terminal coupled to the first input terminal of the optical coupling device for receiving the error signal, a second input terminal, a first output terminal coupled to the output terminal of the optical coupling device for outputting the transmitted error signal and a second output terminal, a first resistor having a first terminal coupled to the second input terminal of the optical coupling device and a second terminal coupled to the second input terminal of the opto-coupler, a second resistor having a first terminal coupled to the third input terminal of the optical coupling device and a second terminal coupled to the first output terminal of the opto-coupler, and a third resistor having a first and a second terminals and electrically connected to the first and the second output terminal of the opto-coupler in parallel, in which the second terminal is coupled to the ground, in which the frequency modulator includes a fourth resistor having a first terminal for receiving the transmitted error signal and a second terminal, a fifth resistor having a first terminal coupled to the second terminal of the fourth resistor and a second terminal, and a first operational amplifier having a non-inverted input terminal, an inverted input terminal coupled to the first terminal of the fifth resistor and an output terminal coupled to the second terminal of the fifth resistor for outputting the frequency modulation signal, in which the pulse-width modulator includes a sixth resistor having a first terminal for receiving the transmitted error signal and a second terminal, a seventh resistor having a first terminal coupled to the second terminal of the sixth resistor and a second terminal, and a second operational amplifier having a non-inverted input terminal, an inverted input terminal coupled to the first terminal of the seventh resistor and an output terminal coupled to the second terminal of the seventh resistor for outputting the pulse-width modulation signal, in which the phase-shift generator includes a comparator having a non-inverted input terminal for receiving the triangle signal, an inverted input terminal for receiving the pulse-width modulation signal and an output terminal, a first latch having a first input terminal for receiving the third outputting signal, a second input terminal for receiving the pulse signal, a third and a fourth input terminals coupled to the ground, a first output terminal for outputting the first output signal and a second output terminal for outputting the third output signal, a first AND gate having a first input terminal for receiving the first output signal, a second input terminal coupled to the output terminal of the comparator and an output terminal, a second latch having a first and a second input terminals coupled to the ground, a third input terminal coupled to the output terminal of the first AND gate, a fourth input terminal, a first output terminal for outputting the fourth output signal and a second output terminal for outputting the second output signal, and a second AND gate having a first input terminal coupled to the output terminal of the comparator, a second input terminal for receiving the third output signal and an output terminal coupled to the fourth input terminal of the second latch.

Preferably, the resonant converter is a resonant DC/AC converter and includes a transformer including a secondary winding having a first terminal coupled to the hybrid control apparatus and a second terminal, and a load including a first terminal coupled to the hybrid control apparatus, a second terminal coupled to the second terminal of the secondary winding, a ballast capacitor having a first terminal coupled to the hybrid control apparatus and a second terminal, and a fluorescent lamp having a first terminal coupled to the second terminal of the ballast capacitor and a second terminal coupled to the second terminal of the secondary winding.

According to the second aspect of the present invention, the controlling method for a resonant converter system, in which the resonant converter system includes a switching device and a hybrid control apparatus coupled to the switching device, includes the steps of: (a) causing the switching device to receive an input voltage for outputting a first output voltage; and (b) generating a driving signal through the hybrid control apparatus so as to selectively adjust one of: a frequency of the switching device when a voltage gain of the resonant converter system is relatively high, and a combination of a phase angle and the frequency of the switching device when a voltage gain of the resonant converter system is relatively low such that the resonant converter would reach a relatively lower voltage gain and have a relatively lower loss during an abnormal status.

Preferably, the resonant converter system further includes a transformer and a rectifier, the transformer receives the first output voltage for outputting a second output voltage, and the rectifier is coupled to the transformer and the hybrid control apparatus and receives the second output voltage for outputting a DC output voltage.

Preferably, the hybrid control apparatus includes a current sensor and a voltage sensor, and both of which are coupled to the rectifier for generating a sensed current and a sensed voltage.

Preferably, the step (b) further includes a step of: (b1) causing the hybrid control apparatus to operate under a first operational mode and selectively adjust one of the phase angle and the combination so as to respectively generate a phase-shift between a first and a fourth switches, and between a second and a third switches when the voltage gain is less than a pre-determined value.

Preferably, the step (b) further includes a step of: (b2) causing the hybrid control apparatus to operate under a second operational mode and adjust the frequency when the voltage gain is not less than the pre-determined value.

Preferably, the step (b) further includes a step of: (b1) causing the hybrid control apparatus to operate under a first operational mode and selectively adjust one of the phase angle and the combination so as to respectively generate a phase-shift between a first and a fourth switches, and between a second and a third switches when the frequency is larger than a pre-determined value.

Preferably, the step (b) further includes a step of: (b2) causing the hybrid control apparatus to operate under a second operational mode and adjust the frequency when the frequency is not larger than the pre-determined value.

The present invention may best be understood through the following descriptions with reference to the accompanying drawings, in which:

DETAILED DESCRIPTION OF THE PREFERRED EMBODIMENT

An LLC resonant DC/DC converter and another resonant DC/AC converter among various resonant converters are employed as examples to describe the proposed method of the present invention.

Figure 4A:
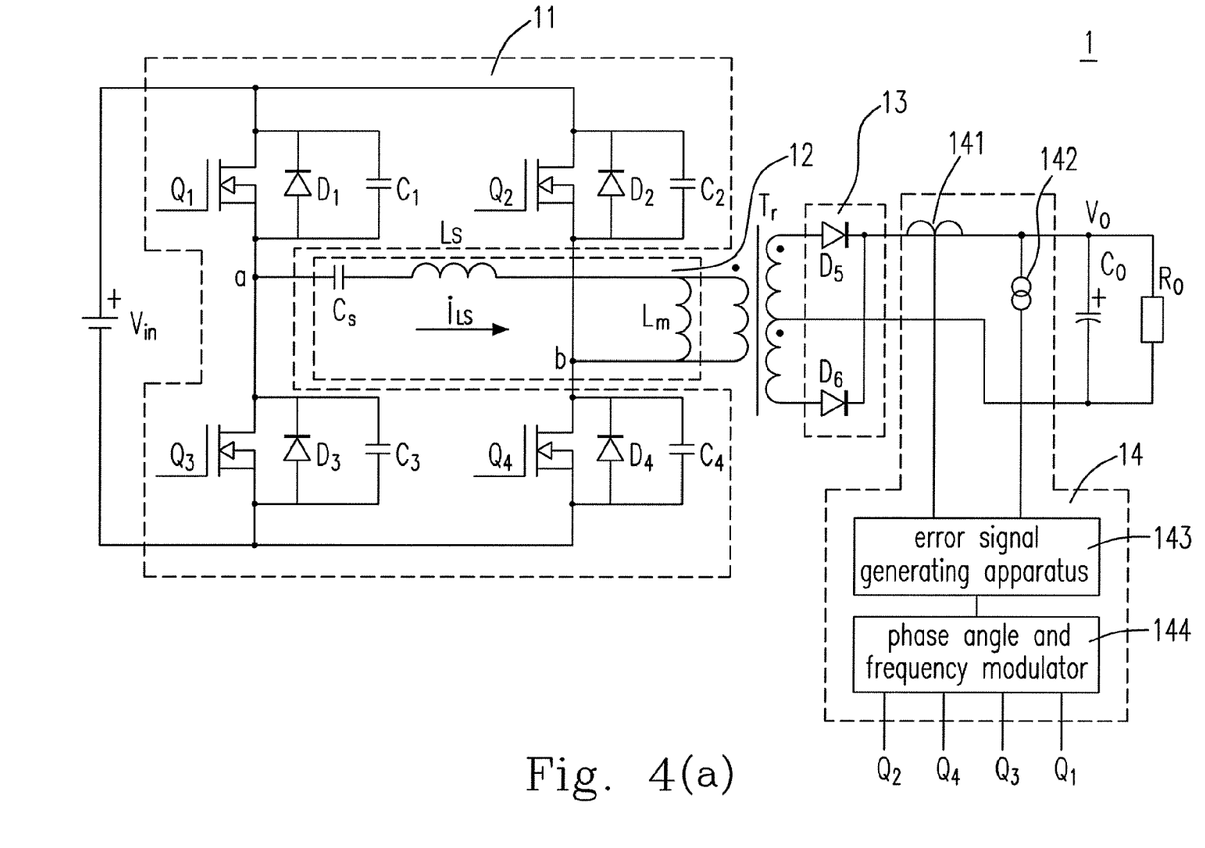
FIG. 4(a) shows a schematic circuit diagram of a LLC resonant DC/DC converter having a hybrid control apparatus according to the first preferred embodiment of the present invention.

Please refer to FIG. 4(a), which shows a schematic circuit diagram of a LLC resonant DC/DC converter having a hybrid control apparatus according to the first preferred embodiment of the present invention. The LLC resonant DC/DC converter 1 includes a full-bridge DC/AC switching device 11, a resonant tank 12, a transformer Tr, a rectifier 13, a hybrid control apparatus 14, an output capacitor Co and a load Ro for receiving a DC input voltage Vin and generating a DC output voltage Vo. The full-bridge DC/AC switching device 11 includes a first switch Q1 electrically connected to a first diode D1 and a first capacitor C1 in parallel, a second switch Q2 electrically connected to a second diode D2 and a second capacitor C2 in parallel, a third switch Q3 electrically connected to a third diode D3 and a third capacitor C3 in parallel and a fourth switch Q4 electrically connected to a fourth diode D4 and a fourth capacitor C4 in parallel. The hybrid control apparatus 14 includes a current sensor 141, a voltage sensor 142, an error signal generating apparatus 143 and a phase angle and frequency modulator 144. In which, switches Q1 and Q3, and switches Q2 and Q4 form two bridge arms respectively. The driving signal of switches Q1 and Q4 and its complementary signal: the driving signal of Q3 and Q2 respectively engage in switching actions using a duty ratio close to 50%. On the middle points of the two bridge arms, a and b, a resonant tank 12 includes a resonant inductor Ls ($i_{LS}$ is the current flowing through Ls), a resonant capacitor Cs and a primary side of the transformer Tr, which are electrically connected with points a and b in series, and further includes a exciting inductor Lm electrically connected to the primary side in parallel. The secondary side of the transformer Tr has a central tap, a full-wave rectifying is engaged via the two diodes D5 and D6 of the rectifier 13, and the output of which is directly filtered and regulated via the output capacitor Co.

Figure 4B:
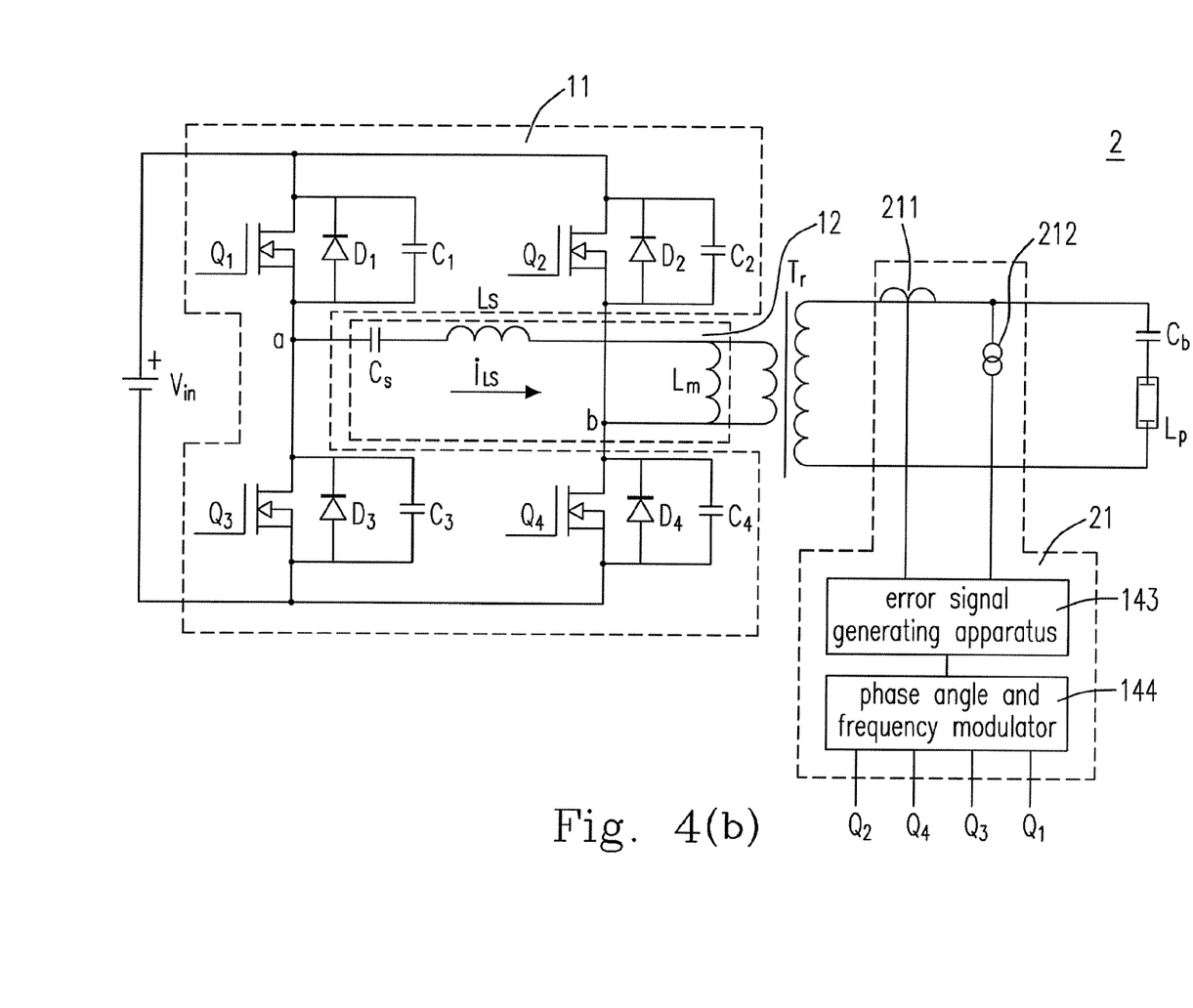
FIG. 4(b) shows a schematic circuit diagram of a resonant DC/AC converter having a hybrid control apparatus according to the second preferred embodiment of the present invention.

FIG. 4(b) shows a schematic circuit diagram of a resonant DC/AC converter having a hybrid control apparatus according to the second preferred embodiment of the present invention. The resonant DC/AC converter 2 includes a full-bridge DC/AC switching device 11, a resonant tank 12, a transformer Tr, a hybrid control apparatus 21, a ballast capacitor Cb and a fluorescent lamp Lp for receiving a DC input voltage and generating an AC output voltage (not shown). The hybrid control apparatus 21 includes a current sensor 211 and a voltage sensor 212, an error signal generating apparatus 143 and a phase angle and frequency modulator 144.

Figure 5A:
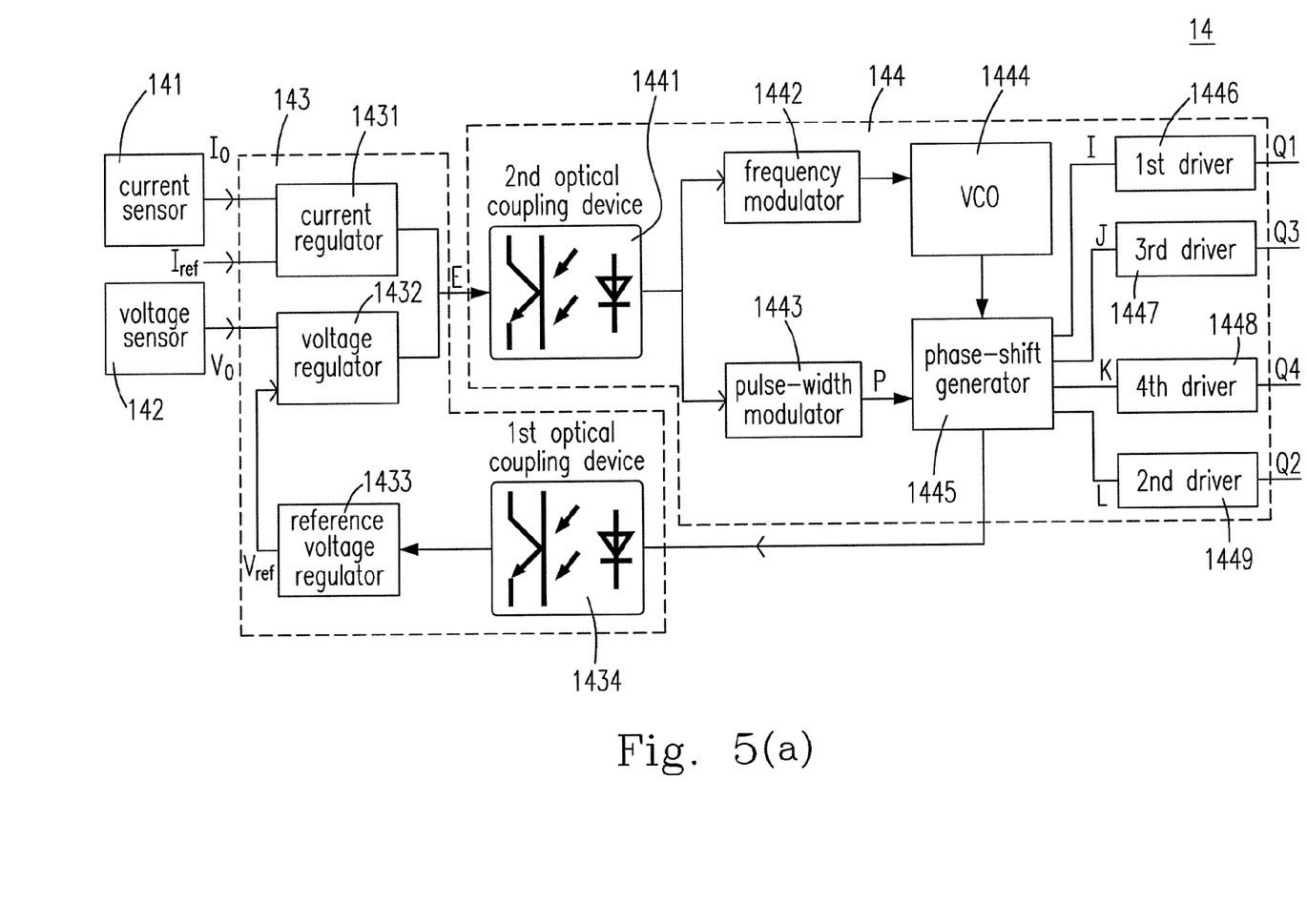
FIG. 5(a) shows a block diagram of the hybrid control apparatus according to the first preferred embodiment of the present invention.

FIG. 5(a) shows a block diagram of the hybrid control apparatus according to the first preferred embodiment of the present invention. In which, except for the current sensor 141, the voltage sensor 142, the error signal generating apparatus 143 and the phase angle and frequency modulator 144, which are included by the hybrid control apparatus 14 as aforementioned, it also shows that the error signal generating apparatus 143 includes a current regulator 1431, a voltage regulator 1432, a reference voltage regulator 1433 and a first optical coupling device 1434, and the phase angle and frequency modulator 144 includes a second optical coupling device 1441, a frequency modulator 1442, a pulse-width modulator 1443, a voltage-controlled oscillator (VCO) 1444, a phase-shift generator 1445, a first driver 1446, a third driver 1447, a fourth driver 1448 and a second driver 1449.

Figure 5B:
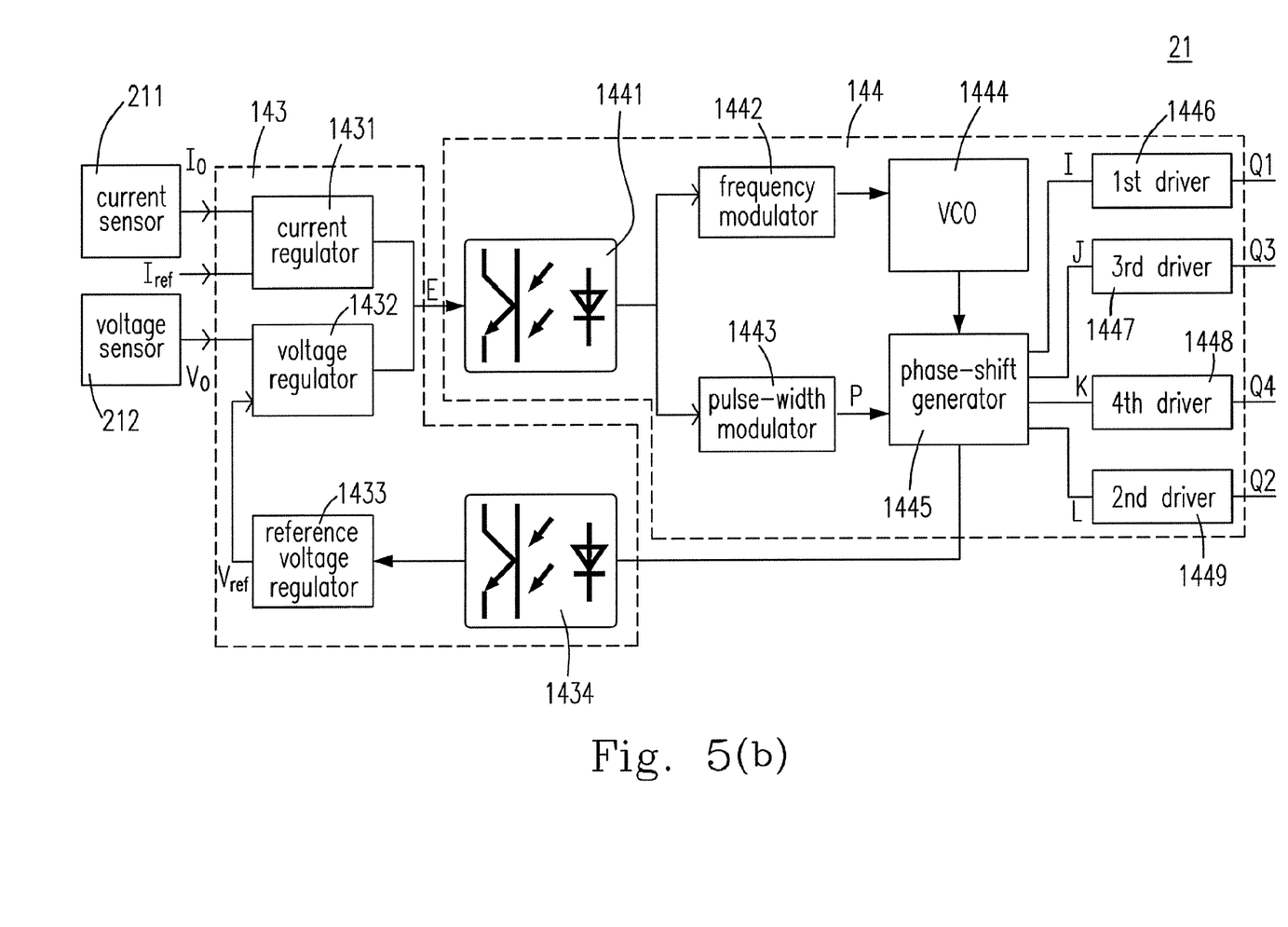
FIG. 5(b) shows a block diagram of the hybrid control apparatus according to the second preferred embodiment of the present invention.

FIG. 5(b) shows a block diagram of the hybrid control apparatus according to the second preferred embodiment of the present invention. In which, except for a hybrid control apparatus 21 includes a current sensor 211 and a voltage sensor 212, the rest of the configuration and the operational principles are the same as those of FIG. 5(a).

As shown in FIG. 5(a), it is a block diagram of the hybrid control apparatus 14 according to the first preferred embodiment of the present invention for realizing the controlling method as shown in FIG. 3. The error signal generating apparatus 143 includes two regulators, one is the voltage regulator 1432 for receiving the sampling signal of the DC output voltage signal Vo and a reference voltage Vref (generated by the reference voltage regulator 1433) so as to generate a voltage regulation signal. Another one is a current regulator 1431 for receiving the sampling signal of the DC output current signal Io and a reference current Iref so as to generate a current regulation signal. The output signals of the two regulators are employed to gain a final regulator output signal E (which is an error signal) through an AND operation. Under a normal condition, the output signal of the voltage regulator is the final regulator output signal E. Under a current-limiting status, the output signal of the current regulator is the final regulator output signal E. The final regulator output signal E is transmitted through the second optical coupling device 1441 to reach the primary side of the transformer Tr and is used as the input of the frequency modulator 1442 and the pulse-width modulator 1443. In which, the frequency regulator is used to control the frequency of the following stage of VCO 1444, and decides the working frequency of the phase-shift generator 1445 and the whole circuit as well. The pulse-width modulator 1443 is used to control the phase angle of the phase-shift generator 1445. The phase-shift generator 1445 outputs a signal to drive the respective drivers 1446-1449 for generating a first to a fourth gate driving signals (not shown) to drive the respective switches, Q1 to Q4, of the full-bridge DC/AC switching device 11 of the resonant DC/DC converter as shown in FIG. 4(a) (which is a LLC-SRC) according to the above-mentioned relationships between the angle and the frequency of the phase angle. The main idea is that the frequency modulator 1442 and the pulse-width modulator 1443 share the final regulator output signal E such that the relationships between the frequency and the duty ratio could be guaranteed, and the smooth exchange between the controlling method of employing the frequency modulation and phase-shift control, and the controlling method of simply employing the frequency modulation. Due to that a close-loop starting method is employed, a synchronous signal is transmitted from the primary side of the transformer Tr via the first optical coupling device 1434 to the reference voltage regulator 1433. After receiving the synchronous signal, the reference voltage regulator 1433 will generate a pre-determined starting voltage waveform to force the output voltage to track the pre-determined starting voltage waveform so as to cause the converter to output the same starting waveform under different load conditions.

Figure 6:
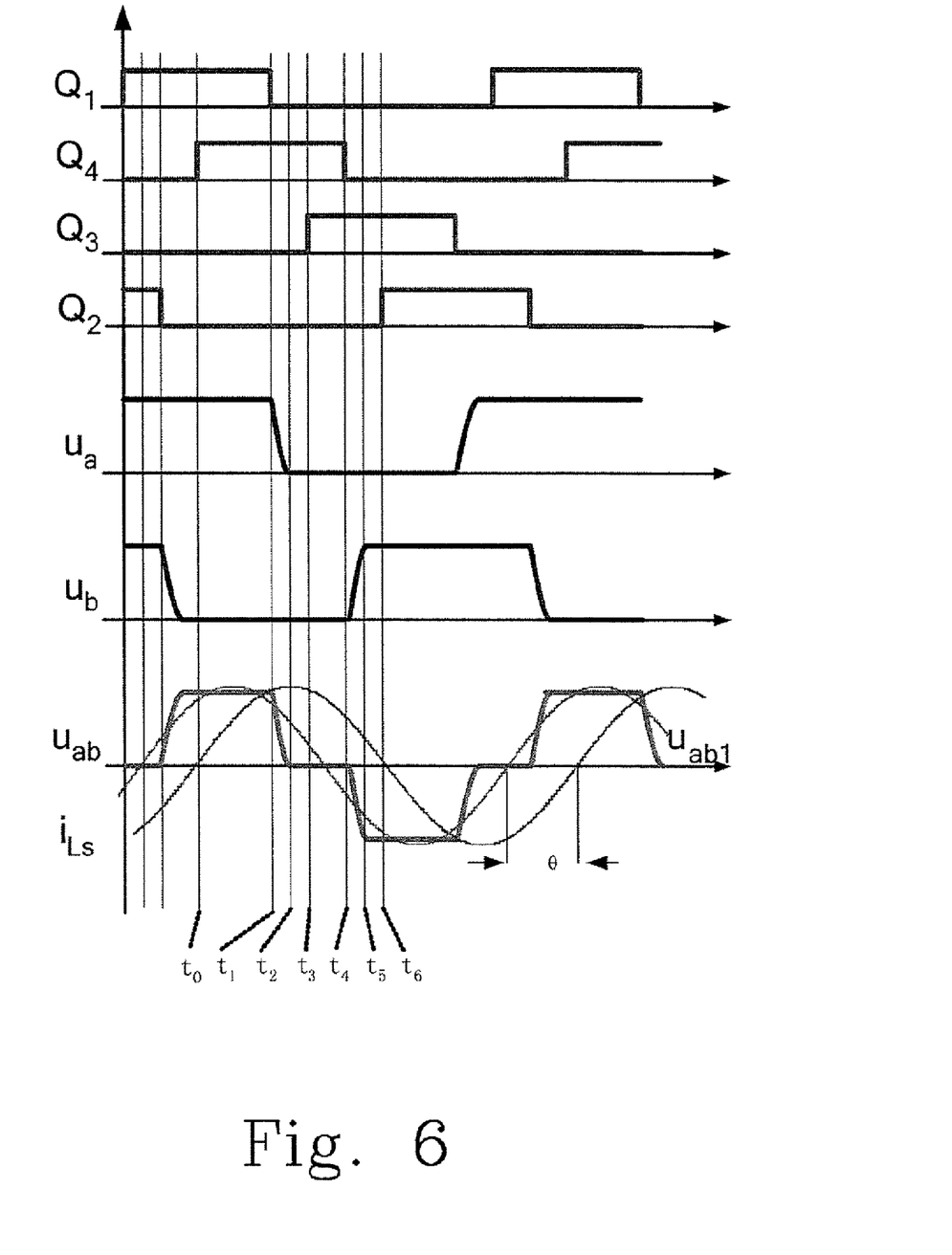
FIG. 6 shows the waveforms under a hybrid control of frequency and phase-shift modulation regarding a controlling method of changing the frequency and the phase angle according to the preferred embodiments of the present invention.

To cause the resonant converter system to reach a relatively lower voltage gain and to solve the problem of having a relatively larger loss under a relatively lower voltage gain simultaneously, a hybrid controlling method is proposed in the present invention. As shown in FIG. 3, the hybrid controlling method includes two control stages: simply using frequency modulation method when the voltage gain is relatively high (the frequency is relatively low at this moment), and using phase-shift control and frequency modulation method when the voltage gain is relatively low (the frequency is relatively high at this moment). Surely, we could simply employ the phase-shift control method when the voltage gain is relatively low. Besides, the resonant converter could only employ one of the controlling method of phase-shift control and frequency modulation, and the controlling method of frequency modulation and directly goes into the normal working status from the abnormal status, that is to say the hybrid controlling method only includes a working mode: employing one of the controlling method of phase-shift control and frequency modulation, and the controlling method of frequency modulation. Using the LLC resonant converter as an example, the voltage gain of the LLC resonant converter is relatively low in general, the working frequency is relatively high and is larger than the resonant frequency usually, and the circuit is degenerated from the LLC resonance to the LC resonance when the LLC resonant converter is working under a current-limiting status or at the beginning of the starting status. As shown in FIG. 6, it shows that the controlling method of phase-shift control and frequency modulation is applied to the LLC resonant converter (LLC-SRC) of FIG. 4(a). The switches on the two bridge arms Q1 and Q3, and Q2 and Q4 are turned on complementarily, switches Q1 and Q4 are not turned on simultaneously, but with phase angles (so as to generate a phase-shift) instead, and the phase angle is defined as the ratio of the period t1 to t4 to half of the time period. In the period t0 to t1, switches Q1 and Q4 are turned on, and switches Q2 and Q3 are turned off. The ratio of the period t0 to t1 and the time period is defined as the duty ratio (Ds) of the voltage across the two middle points of the two bridge arms (a and b, respectively having voltages $u_a$ and $u_b$), $u_{ab}$. In the period t0 to t1, $i_{LS}$ is resonant and increased, the resonant capacitor Cs is resonant with the resonant inductor Ls and sends energy to the secondary side of the transformer Tr. At the moment t1, switch Q1 is turned off, $i_{LS}$ starts to discharge the parasitic capacitor C3 of the switch Q3, and the parasitic capacitor C1 of the switch Q1. At the moment t2, the voltages across the two terminals of the switch Q1 is increased to the input voltage Vin, and the voltages across the two terminals of the switch Q3 is decreased to zero. After that, the diode D3, reverse-connected in parallel with the switch Q3, is turned on. The resonant capacitor Cs and the resonant inductor Ls are resonant and send energy to the secondary side of the transformer Tr continuously. At moment t3, the switch Q3 is turned on, and the switch Q3 is zero-voltage switching (ZVS), and the resonant capacitor Cs and the resonant inductor Ls are resonant continuously. At moment t4, the switch Q4 is turned off, and the current $i_{LS}$ still has a positive value, discharges the parasitic capacitor C2 of the switch Q2, and charges the parasitic capacitor C4 of the switch Q4 until the moment t5, and the diode D2, reverse-connected in parallel with the switch Q2, is on then. At moment t6, the switch Q2 is turned with ZVS. At this moment, the resonant inductor Ls, the resonant capacitor Cs and the transformer Tr are resonant, and the current $i_{LS}$ decreases to a negative value gradually, and another half-cycle of the working process begins then. Viewing from FIG. 6, the voltage across the two middle points, a and b, of the two bridge arms (Q1 and Q3, and Q2 and Q4 respectively) $u_{ab}$, is a quasi-square wave, and only the fundamental $u_{ab1}$ is considered here. Due to that the working frequency is larger than the resonant frequency, the impedance of the resonant inductor Ls and the resonant capacitor Cs electrically connected in series has the characteristics of an inductor, the primary side current $i_{LS}$ lags behind $u_{ab1}$ for a specific phase angle of θ, and the larger the θ is, the smaller the duty ratio Ds is.

From the analysis above, the phase-shift control could attain the soft-switching. Through enlarging the phase-angle to decrease the voltage gain, and under the same voltage gain, the working frequency under the phase-shift control method is relatively lower than that under the simple frequency control method. In an LLC phase-shift control, whether a zero-voltage switching of the switch of the primary side of the transformer could be accomplished is decided upon the current of the primary side of the transformer and the angle of that current lagging behind the voltage across the bridge arms $u_{ab}$. When the phase angle is relatively larger, the angle of that current lagging behind the voltage across the bridge arms $u_{ab}$ is also relatively larger in order to accomplish the soft-switching, and the working frequency must be enlarged then. Therefore, changing the frequency and changing the phase angle are complement to each other: changing the frequency is for accomplishing a relatively smaller duty ratio, and changing the phase angle is for minimizing the increase of the frequency. In general, a set of working frequencies and phase angles could all satisfied the requirements while under the same input and output conditions. But due to the conditions for accomplishing the soft-switching and the required working frequency are varied, the losses are also different. One of the best alternatives would be let the frequency of the switch and the phase angle change along the minimum losses points. To simplify the design of the control, the curve could be simplified to a straight-line. As above-mentioned, FIG. 3 is a waveform diagram of the frequency ratio of the converter's switch vs. the duty ratio of the voltage of the middle points of the bridge arms $u_{ab}$, and the linearly controlled frequency and phase angle are employed such that the controlling method which employs proportional control of the frequency and phase angle could be accomplished more easily, and the complexity of the control could be decreased.

Figure 7:
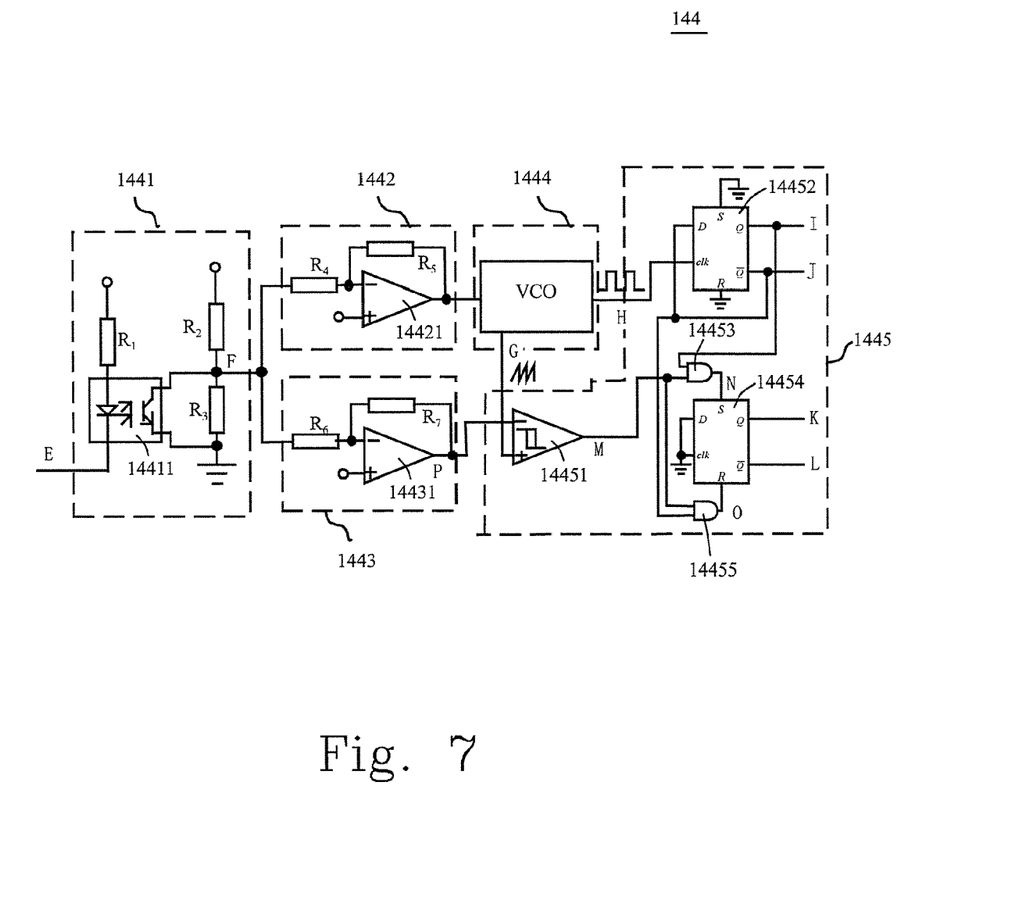
FIG. 7 shows a schematic circuit diagram of a phase angle and frequency modulator of the hybrid control apparatus according to the first and the second preferred embodiments of the present invention.

FIG. 7 shows a schematic circuit diagram of a phase angle and frequency modulator of the hybrid control apparatus according to the first and the second preferred embodiments of the present invention as shown in FIGS. 5(a) and 5(b). In which, the second optical coupling device 1441 includes a first resistor R1, a second resistor R2, a third resistor R3 and an opto-coupler 14411. The second optical coupling device 1441 receives the final regulator output signal E and outputs a signal F employed as the input of the frequency modulator 1442 and the pulse-width modulator 1443. In which the frequency modulator 1442 employs a proportional amplifier and includes a fourth resistor R4, a fifth resistor R5 and a first operational amplifier 14421. The pulse-width modulator 1443 also employs a proportional amplifier and includes a sixth resistor R6, a seventh resistor R7, and a second operational amplifier 14431. Considering that changing the duty ratio would only be used in part of the frequency band, let the pulse-width modulator 1443 be saturated in the low frequency band so as to attain the maximum output duty ratio through the proper design of the voltage gain and the reference voltage. Similarly, employs a method of voltage clamping could also achieve the same effects. The VCO 1444 receives the output of the frequency modulator 1442 and generates two output signals G and H. In which, G is a triangle wave, and H is a pulse train having the same frequency as the triangle wave G. The VCO 1444 and part of the outputs of the phase-shift generator 1445 commonly decide the phase angles and frequencies of the four output signals I, J, K, and L. In which, the phase-shift generator 1445 includes a comparator 14451, a first latch 14452, a first AND gate 14453, a second latch 14454 and a second AND gate 14455.

Figure 8:
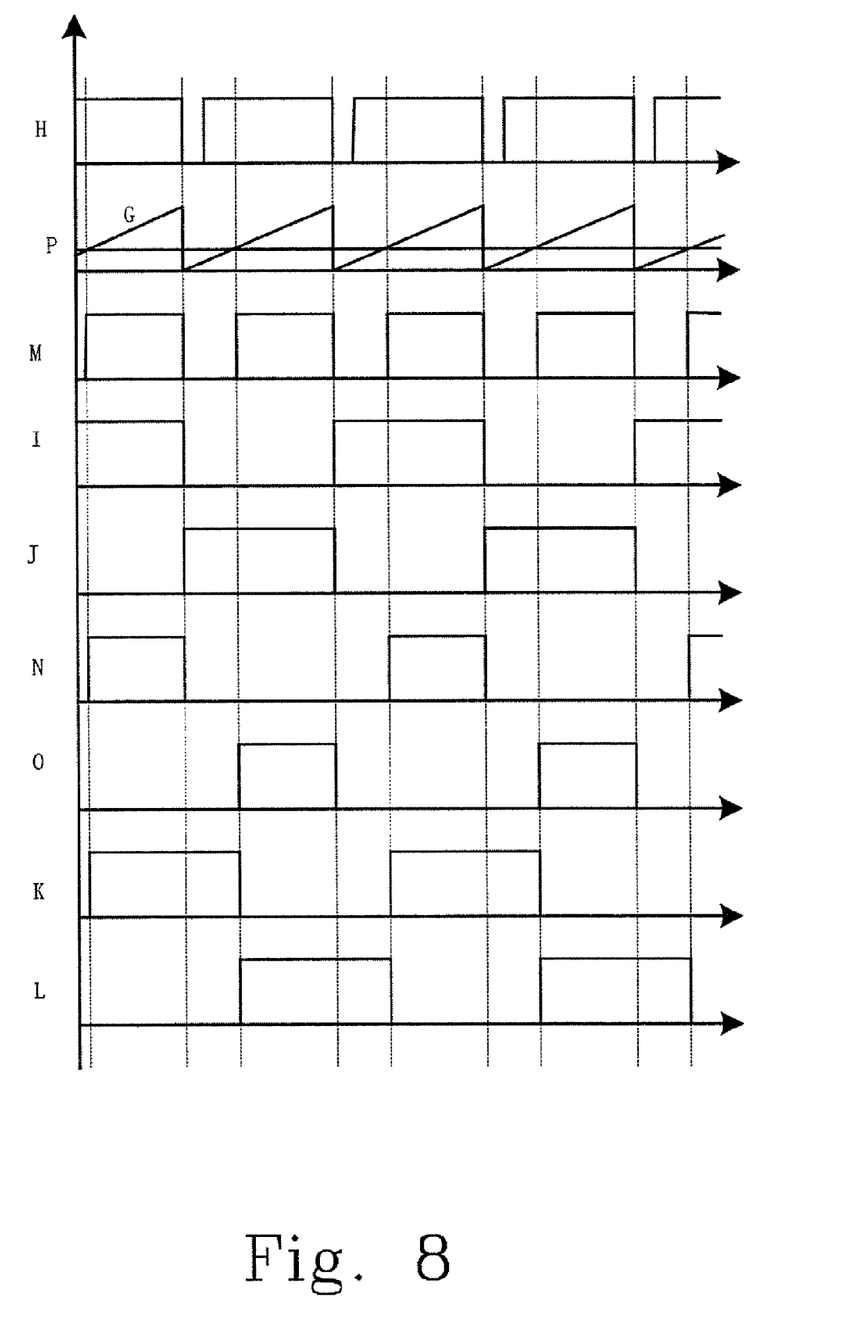
FIG. 8 shows a waveform diagram of the critical points as shown in FIG. 7.

FIG. 8 is the waveform diagram of the critical points (including H, P, G, M, I, J, N, O, K and L) as shown in FIG. 7. In which, G is a triangle wave signal, and H is a pulse train having the same frequency as the triangle wave G. H is employed as the clock input of the first latch 14452 for the two outputs I and J. Thus the outputs of I and J are complementary signals, and the frequency of which is half of that of H signal. The output P of the pulse-width modulator 1443 is compared with the triangle signal G firstly, the resulting signal M is sent to the two controlling terminals, S and R of the second latch 14454 as a reference of the phase angle secondly, to generate two phase-shift signals K and L, which respectively have a phase-shift width related to M with I and with J.

According to the aforementioned descriptions, a resonant converter system having a relatively better efficiency is provided to adjust a phase angle and a frequency of the resonant converter system such that the resonant converter system would reach a relatively lower voltage gain and have a relatively lower loss when the resonant converter system is working under an abnormal status. Besides, a resonant DC/AC converter having a relatively better efficiency is also provided to adjust a phase angle and a frequency of the resonant converter such that the resonant converter would reach a relatively lower voltage gain and have a relatively lower loss when the resonant converter is working under an abnormal status.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A resonant converter system, comprising:
   a resonant converter receiving an input voltage for outputting an output voltage and having a switching device; and
   a hybrid control apparatus coupled to the resonant converter for generating a driving signal to selectively adjust one of: a frequency of the switching device when a voltage gain of the resonant converter system is relatively high, and a combination of a phase angle and the frequency of the switching device when a voltage gain of the resonant converter system is relatively low such that the resonant converter would reach a relatively lower voltage gain and have a relatively lower loss when the resonant converter is working under an abnormal status.

2. A system according to claim 1, wherein the resonant converter is one of a DC/DC resonant converter and a DC/AC resonant converter.

3. A system according to claim 1, wherein the abnormal status is one of a starting status and a current limiting status of the resonant converter, the frequency of the switching device is relatively low when the voltage gain of the resonant converter system is relatively high, and the frequency of the switching device is relatively high when the voltage gain of the resonant converter system is relatively low.

4. A system according to claim 1, wherein the resonant converter comprises a full-bridge switching device, and the full-bridge switching device comprises:
 a first and a second input terminals receiving the input voltage;
 a first and a second output terminals outputting a first AC output voltage;
 a first power switch module, comprising:
  a first power switch having a first terminal coupled to the first input terminal, a second terminal coupled to the first output terminal and a control terminal; and
  a first diode having an anode coupled to the second terminal of the first power switch and a cathode coupled to the first terminal of the first power switch;
 a second power switch module, comprising:
  a second power switch having a first terminal coupled to the first terminal of the first power switch, a second terminal coupled to the second output terminal and a control terminal; and
  a second diode having an anode coupled to the second terminal of the second power switch and a cathode coupled to the first terminal of the second power switch;
 a third power switch module, comprising:
  a third power switch having a first terminal coupled to the second terminal of the first power switch, a second terminal coupled to the second input terminal and a control terminal; and
  a third diode having an anode coupled to the second terminal of the third power switch and a cathode coupled to the first terminal of the third power switch; and
 a fourth power switch module, comprising:
  a fourth power switch having a first terminal coupled to the second output terminal, a second terminal coupled to the second terminal of the third power switch and a control terminal; and
  a fourth diode having an anode coupled to the second terminal of the fourth power switch and a cathode coupled to the first terminal of the fourth power switch,
 wherein the driving signal comprises a first to a fourth gate driving signals, and the control terminals of the first to the fourth power switches are coupled to the hybrid control apparatus and receive the first to the fourth gate driving signals respectively.

5. A system according to claim 4, wherein the resonant converter is a full-bridge LLC resonant DC/DC converter and further comprises:
 an LLC resonant tank coupled to the first and the second output terminals of the full-bridge switching device for generating a resonance;
 a transformer receiving the first AC output voltage for outputting a second AC output voltage, and comprising:
  a primary winding having a first terminal coupled to the LLC resonant tank and a second terminal coupled to the full-bridge switching device; and
  a secondary winding having a first terminal and a second terminal;
 a rectifier coupled to the first and the second terminals of the secondary winding for receiving the second AC output voltage; and
 an output capacitor coupled to the rectifier for outputting a DC output voltage.

6. A system according to claim 5, wherein the LLC resonant tank comprises:
 a resonant capacitor having a first terminal coupled to the first output terminal of the full-bridge switching device and a second terminal;
 a resonant inductor having a first terminal coupled to the second terminal of the resonant capacitor and a second terminal; and
 an exciting inductor having a first terminal coupled to the second terminal of the resonant inductor and a second terminal coupled to the second output terminal of the full-bridge switching device,
 wherein the exciting inductor is electrically connected to the primary winding in parallel.

7. A system according to claim 5, wherein the rectifier is a full-wave rectifier.

8. A system according to claim 4, wherein the hybrid control apparatus comprises:
 a current sensor coupled to the resonant converter for generating a sensed current;
 a voltage sensor coupled to the resonant converter for generating a sensed voltage;
 an error signal generating apparatus receiving the sensed current and the sensed voltage for generating an error signal; and
 a phase angle and frequency modulator receiving the error signal for generating the first to the fourth gate driving signals.

9. A system according to claim 8, wherein the error signal generating apparatus comprises:
 an optical coupling device transmitting a synchronous signal;
 a reference voltage regulator receiving the transmitted synchronous signal for generating a reference voltage;
 a current regulator receiving the sensed current and a reference current for generating a current regulating signal; and
 a voltage regulator receiving the sensed voltage and the reference voltage for generating a voltage regulating signal,
 wherein the error signal is generated via an AND operation of the current regulating signal and the voltage regulating signal.

10. A system according to claim 8, wherein the phase angle and frequency modulator comprises:
 an optical coupling device receiving and transmitting the error signal;
 a frequency modulator receiving the transmitted error signal for generating a frequency modulation signal;
 a pulse-width modulator receiving the transmitted error signal for generating a pulse-width modulation signal;
 a voltage controlled oscillator receiving the frequency modulation signal for generating an oscillating signal;
 a phase-shift generator receiving the pulse-width modulation signal and the oscillating signal for generating a first to a fourth outputting signals, wherein the oscillating signal includes a triangle signal and a pulse signal; and
 a first to a fourth drivers respectively receiving the first to the fourth outputting signals for generating the first to the fourth gate driving signals.

11. A system according to claim 10, wherein the optical coupling device comprises:
a first, a second and a third input terminals;
an output terminal;
a ground;
an opto-coupler having a first input terminal coupled to the first input terminal of the optical coupling device for receiving the error signal, a second input terminal, a first output terminal coupled to the output terminal of the optical coupling device for outputting the transmitted error signal and a second output terminal;
a first resistor having a first terminal coupled to the second input terminal of the optical coupling device and a second terminal coupled to the second input terminal of the opto-coupler;
a second resistor having a first terminal coupled to the third input terminal of the optical coupling device and a second terminal coupled to the first output terminal of the opto-coupler; and
a third resistor having a first and a second terminals and electrically connected to the first and the second output terminal of the opto-coupler in parallel, wherein the second terminal is coupled to the ground,
wherein the frequency modulator comprises:
a fourth resistor having a first terminal for receiving the transmitted error signal and a second terminal;
a fifth resistor having a first terminal coupled to the second terminal of the fourth resistor and a second terminal; and
a first operational amplifier having a non-inverted input terminal, an inverted input terminal coupled to the first terminal of the fifth resistor and an output terminal coupled to the second terminal of the fifth resistor for outputting the frequency modulation signal,
wherein the pulse-width modulator comprises:
a sixth resistor having a first terminal for receiving the transmitted error signal and a second terminal;
a seventh resistor having a first terminal coupled to the second terminal of the sixth resistor and a second terminal; and
a second operational amplifier having a non-inverted input terminal, an inverted input terminal coupled to the first terminal of the seventh resistor and an output terminal coupled to the second terminal of the seventh resistor for outputting the pulse-width modulation signal,
wherein the phase-shift generator comprises:
a comparator having a non-inverted input terminal for receiving the triangle signal, an inverted input terminal for receiving the pulse-width modulation signal and an output terminal;
a first latch having a first input terminal for receiving the third outputting signal, a second input terminal for receiving the pulse signal, a third and a fourth input terminals coupled to the ground, a first output terminal for outputting the first output signal and a second output terminal for outputting the third output signal;
a first AND gate having a first input terminal for receiving the first output signal, a second input terminal coupled to the output terminal of the comparator and an output terminal;
a second latch having a first and a second input terminals coupled to the ground, a third input terminal coupled to the output terminal of the first AND gate, a fourth input terminal, a first output terminal for outputting the fourth output signal and a second output terminal for outputting the second output signal; and a second AND gate having a first input terminal coupled to the output terminal of the comparator, a second input terminal for receiving the third output signal and an output terminal coupled to the fourth input terminal of the second latch.

12. A system according to claim 4, wherein the resonant converter is a resonant DC/AC converter and comprises:
a transformer including a secondary winding having a first terminal coupled to the hybrid control apparatus and a second terminal; and
a load, comprising:
a first terminal coupled to the hybrid control apparatus;
a second terminal coupled to the second terminal of the secondary winding;
a ballast capacitor having a first terminal coupled to the hybrid control apparatus and a second terminal; and
a fluorescent lamp having a first terminal coupled to the second terminal of the ballast capacitor and a second terminal coupled to the second terminal of the secondary winding.

13. A controlling method for a resonant converter system, wherein the resonant converter system comprises a switching device and a hybrid control apparatus coupled to the switching device, comprising the steps of:
(a) causing the switching device to receive an input voltage for outputting a first output voltage; and
(b) generating a driving signal through the hybrid control apparatus so as to selectively adjust one of: a frequency of the switching device when a voltage gain of the resonant converter system is relatively high, and a combination of a phase angle and the frequency of the switching device when a voltage gain of the resonant converter system is relatively low such that the resonant converter would reach a relatively lower voltage gain and have a relatively lower loss during an abnormal status.

14. A method according to claim 13, wherein the resonant converter system further comprises a transformer and a rectifier, the transformer receives the first output voltage for outputting a second output voltage, and the rectifier is coupled to the transformer and the hybrid control apparatus and receives the second output voltage for outputting a DC output voltage.

15. A method according to claim 14, wherein the hybrid control apparatus comprises a current sensor and a voltage sensor, and both of which are coupled to the rectifier for generating a sensed current and a sensed voltage.

16. A method according to claim 13, wherein the step (b) further comprises a step of:
(b1) causing the hybrid control apparatus to operate under a first operational mode and selectively adjust one of the phase angle and the combination so as to respectively generate a phase-shift between a first and a fourth switches, and between a second and a third switches when the voltage gain is less than a pre-determined value.

17. A method according to claim 16, wherein the step (b) further comprises a step of:
(b2) causing the hybrid control apparatus to operate under a second operational mode and adjust the frequency when the voltage gain is not less than the pre-determined value.

18. A method according to claim 13, wherein the step (b) further comprises a step of:

(b1) causing the hybrid control apparatus to operate under a first operational mode and selectively adjust one of the phase angle and the combination so as to respectively generate a phase-shift between a first and a fourth switches, and between a second and a third switches when the frequency is larger than a pre-determined value.

19. A method according to claim 18, wherein the step (b) further comprises a step of:
(b2) causing the hybrid control apparatus to operate under a second operational mode and adjust the frequency when the frequency is not larger than the pre-determined value.

\* \* \* \* \*